US010356606B2

(12) United States Patent
Zhang et al.

(10) Patent No.: US 10,356,606 B2
(45) Date of Patent: Jul. 16, 2019

(54) PROXY PLATFORM FOR INTER-OPERATOR PROVISIONING OF ESIM PROFILES

(71) Applicant: Syniverse Technologies, LLC, Tampa, FL (US)

(72) Inventors: David Zhang, Tampa, FL (US); Huiyue Xu, Tampa, FL (US); Sreenivasa Ganji, Tampa, FL (US); Prashant Datar, Tampa, FL (US)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 16/190,965

(22) Filed: Nov. 14, 2018

(65) Prior Publication Data

US 2019/0159016 A1    May 23, 2019

Related U.S. Application Data

(60) Provisional application No. 62/585,920, filed on Nov. 14, 2017.

(51) Int. Cl.
| | |
|---|---|
| *H04W 8/18* | (2009.01) |
| *H04B 1/3816* | (2015.01) |
| *H04W 12/00* | (2009.01) |
| *H04L 29/06* | (2006.01) |
| *H04W 12/06* | (2009.01) |

(52) U.S. Cl.
CPC ........ *H04W 8/183* (2013.01); *H04B 1/3816* (2013.01); *H04L 63/0869* (2013.01); *H04W 12/001* (2019.01); *H04W 12/06* (2013.01)

(58) Field of Classification Search
USPC ........................................................ 455/558
See application file for complete search history.

(56) References Cited

U.S. PATENT DOCUMENTS

| | | | |
|---|---|---|---|
| 2014/0237101 A1 | 8/2014 | Park | |
| 2014/0349617 A1 | 11/2014 | Li et al. | |
| 2016/0020802 A1 | 1/2016 | Lee et al. | |
| 2016/0277051 A1* | 9/2016 | Yang | H04B 1/3816 |
| 2016/0295544 A1 | 10/2016 | Jiang et al. | |
| 2016/0345162 A1* | 11/2016 | Li | H04B 1/3816 |
| 2017/0093565 A1* | 3/2017 | Yang | H04L 9/0822 |
| 2017/0289788 A1 | 10/2017 | Lalwaney | |
| 2018/0270363 A1* | 9/2018 | Guday | H04M 15/8083 |
| 2018/0352422 A1* | 12/2018 | Shah | H04W 8/205 |
| 2019/0007826 A1* | 1/2019 | Wane | H04W 4/24 |

* cited by examiner

*Primary Examiner* — Ganiyu A Hanidu
(74) *Attorney, Agent, or Firm* — Andriy Lytvyn; Smith & Hopen, P.A.

(57) ABSTRACT

A system for supporting the deployment of an embedded subscriber identification module (eSIM) provisioning management system on the ES3 interface between Subscription Manager Data Preparation (SM-DP) of a target mobile network operator (MNO) and Subscription Manager Secure Routing (SM-SR) of a current MNO. A SM-Proxy implements a SM-SR functionality on a first interface towards the SM-DP, and implements a SM-DP functionality on a second interface towards the SM-SR. A hosted SM-DP implements a RESTful API to receive SIM profile information from a provisioning server in the target MNO's network. An Agreement Management system controls a set of eSIM provisioning rules. A Service Portal enables the MNOs to manage their eSIM provisioning rules across their MNO partners.

20 Claims, 5 Drawing Sheets

PROXY PLATFORM FOR INTER-OPERATOR PROVISIONING OF ESIM PROFILES

CROSS-REFERENCE TO RELATED APPLICATIONS

This application claims priority to U.S. Provisional Patent Application No. 62/585,920, entitled "PROXY PLATFORM FOR INTER-OPERATOR PROVISIONING OF ESIM PROFILES," filed Nov. 14, 2017, the entirety of which is incorporated herein by reference.

BACKGROUND OF THE INVENTION

1. Field of the Invention

This invention relates generally to the field of telecommunications networks, specifically to the provisioning of Embedded Universal Integrated Circuit Card (eUICC) SIM cards used as identity modules in mobile devices.

More specifically, it relates to methods and systems of provisioning new Mobile Network Operator (MNO) subscriptions on eSIMs that currently have active profiles belonging to another MNO.

2. Brief Description of the Related Art

Widespread adoption of the Internment of Things (IoT) devices and Machine to Machine (M2M) communications create a need for a robust scheme capable of efficiently connecting billions of devices to mobile networks. Traditionally, to enable a telecommunications device to connect to a particular mobile network, a SIM card issued by the Mobile Network Operator (MNO) would have to be inserted into the device. In this scheme, to switch the mobile connection to a different MNO, the SIM card for the current MNO would be removed from the device and would be replaced with another SIM card associated with the new MNO. The requirement to swap out SIM cards whenever a connection to a different mobile network is needed constitutes a major flaw, especially in the context of M2M communication. It is much more efficient and desirable to install a single SIM card when the device is manufactured and then enable that SIM card to support a connection to a MNO of a user's choice.

To address this issue, Global System for Mobile Association (GSMA) defines the Remote Provisioning Architecture for Embedded SIM as guidelines for Mobile Operators. An eSIM is built into an IoT device and provides a secure, interoperable architecture to facilitate commercial deployment of system that enable remote provisioning of a target MNO profile into the eSIM. The GSMA has specified the method and protocols for MNOs to provision their profile information on eSIMs using a wireless communication channel. This method is referred to as Over-The-Air (OTA) provisioning. OTA provisioning of entirely new SIM profiles can be used for devices that travel across operator networks. This method streamlines changing of MNO and facilitates reduction of out-bound roaming charges that would otherwise be incurred if local MNO SIM profiles were not used.

eSIMs support multiple subscription profiles. These profiles can be added, activated, disabled, and deleted as needed. SIM OTA is currently implemented using either (1) SMS, which is a slower method, or (2) SMS along with HTTPs or CAT_TP, which is a faster method. GSMA has standardized OTA architecture for eSIM profile installation and switching. The profile installation and switching are based on GlobalPlatform Card specifications (v2.2.1), which is incorporated herein by reference. Subscription Manager Data Preparation (SM-DP) function is used for creating SIM profiles, while Subscription Manager Secure Routing (SM-SR) function is used to communicate with eUICC to install, activate, deactivate, and delete profiles. Certificate Issuer (CI) is used for authentication and integrity protection.

For eSIM profile switching, a target MNO has to use the current MNO's OTA platform for provisioning. Thus, target MNO's SM-DP needs to have connectivity to existing MNO's SM-SR. The problem with applying the GSMA OTA architecture in this case is that in order for a local MNO (target MNO) to provision its SIM profile onto the eSIM, the target MNO must have an agreement with and connectivity to the OTA platform of the MNO that owns the currently active SIM profile on the eSIM (current MNO). Such agreements and connectivity are difficult to implement. MNOs have a strong need to exercise control over SIM information for security. Hence, most MNOs are very reluctant or unwilling to permit other MNOs to connect to their SIM OTA platforms because such connection may expose SIM information to external entities.

Thus, what is needed is a solution that enables the target MNO to provision its SIM profile onto an eSIM without having to connect to the current MNO's OTA platform.

SUMMARY OF THE INVENTION

This invention provides methods and systems to resolve the problem of ubiquitous agreements and connectivity between MNOs wanting to provision new SIM profiles onto eSIMs associated with other MNOs. The invention enables local service in any MNO network via a single connection to the eSIM Proxy. The invention eliminates a requirement for MNO support for GSMA Remote SIM Provisioning and enables Mobile Virtual Network Operator (MVNO) services across all geographic regions, thereby enabling local rates in all regions.

The solution provided by the present invention is enabled via a Subscription Manager (SM)-Proxy, which is an intermedium gateway or module positioned between the SM-DP of the target MNO and SM-SR of the current MNO. SM-Proxy enables creation, download, activation, and/or deactivation of the target MNO's profile over an existing subscription. SM-Proxy serves as a proxy between SM-DP of target MNO and SM-SR of current MNO. eUICC Manufacturer (EUM) interface is retained by the current MNO, and SIM profile is encrypted during transfer.

In an embodiment, the system for an eSIM provisioning management uses SM-Proxy described above. The SM-Proxy is in communication with the SM-DP of a target MNO and SM-SR of a current MNO. The eSIM is associated with the SM-SR of the current MNO. The SM-Proxy receives requests from SM-DP of the target MNO for creating, downloading, enabling, or disabling a Profile information of the target MNO on the eSIM. The Profile information can include a combination of file structure, data, and applications.

Responsive to receiving the requests from SM-DP of the target MNO, SM-Proxy transmits corresponding requests to the SM-SR of the current MNO for creating, downloading, enabling, or disabling the Profile information of the target MNO on the eSIM. If the Profile information of the target MNO has been successfully created, downloaded, activated, or deactivated on the eSIM, SM-Proxy receives a confirmation message from the SM-SR of the current MNO. The SM-Proxy transmits a confirmation message to the SM-DP of the target MNO notifying the target MNO that its Profile information has been successfully created downloaded, activated or deactivated on the eSIM.

In an embodiment the system further includes a hosted SM-DP. The hosted SM-DP is used to implement a RESTful Application Program Interface (API) to receive the Profile information from a provisioning server in the target MNO. The system of claim 2, wherein the hosted SM-DP implements the RESTful Application Programming Interface (API) toward the provisioning server in a network of the target MNO. The hosted SM-DP and the provisioning server can perform mutual authentication. The hosted SM-DP and the provisioning server can also encrypt data transfers.

In an embodiment, the system includes an Agreement Management system. The Agreement Management system is configured to control a set of eSIM provisioning rules. The Agreement Management system validates eSIM provisioning requests by implementing a policy control server interface with the SM-Proxy.

In an embodiment, the system further includes a Service Portal. The Service Portal is configured to enable the current MNO to manage the set of eSIM provisioning rules across a plurality of target MNOs. The Service Portal can provide a graphic user interface (GUI) to the target MNO to provision the set of eSIM provisioning rules. The Service Portal can also provide an API to the MNO to automate the provisioning of the set of eSIM provisioning rules.

In an embodiment, the SM-Proxy can be configured to authenticate itself to the SM-DP of the target MNO and the SM-SR of the current MNO using certificates issued by a Certificate Issuer. Data transfer between the SM-Proxy, the SM-DP and the SM-SR is encrypted and decrypted by the SM-Proxy.

BRIEF DESCRIPTION OF THE DRAWINGS

For a fuller understanding of the invention, reference should be made to the following detailed disclosure, taken in connection with the accompanying drawings, in which.

DETAILED DESCRIPTION OF THE PREFERRED EMBODIMENT

The present invention pertains to networking and application system 10 for enabling installation and activation of a target mobile network operator's (MNO) profile on an embedded SIM (eSIM or eUICC) 12. Target MNO's profile is a combination of a file structure, data and applications to be provisioned onto, or present on, an eSIM.

Figure 1:
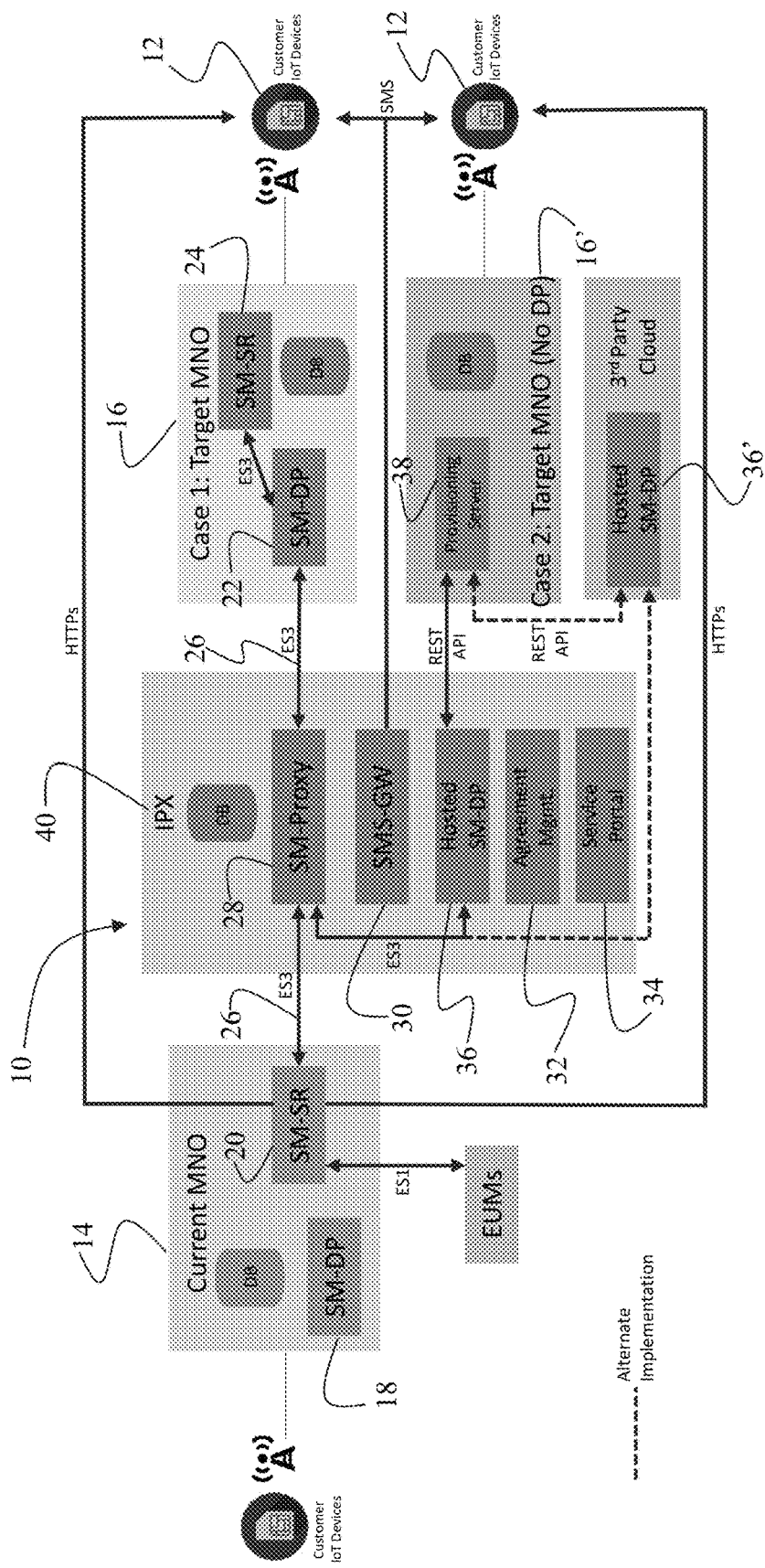
FIG. 1 is a block diagram schematically depicting the network architecture of an embodiment of the present invention.

The architecture of the invention is schematically depicted in FIG. 1. Specialized networking and application system 10 enables a target MNO 16 to provision its mobile network profile on eSIM 12 associated with a current MNO 14. Current MNO 14 has a Subscription Manager Data Preparation (SM-DP) 18 and a Subscription Manager Secure Routing (SM-SR) 20. SM-DP 18 encrypts operator profile and manages the installation of the MNO profile onto eSIM 12. SM-SR 20 delivers the encrypted MNO profile to eSIM 12 and, after the profile is installed on eSIM 12, manages the MNO profile via HTTPs and/or SMS.

Target MNO 16 has its own SM-DP 22 and SM-SR 24. SM-DP 22 is responsible for encrypting the profile of the target MNO 16 and managing its installation onto the eSIM 12. However, because, at the onset, the profile of target MNO 16 is not installed on eSIM 12, SM-SR 24 of target MNO 16 is not in communication with eSIM 12. Thus, in order for target MNO 16 to provision its profile to eSIM 12, SM-DP 22 of target MNO 16 must communicate with SM-SR 20 of current MNO 14 via ES3 interface 26. If current MNO 14 and target MNO 16 do not have an agreement with one another, such direct communication may not be possible. Network and application system 10 resolves this issue.

Network and application system 10 introspects data communications between SM-DP 22 of the target MNO 12 and SM-SR 20 of the current MNO 16. System 10 introspects and controls the ES3 interface 26 used for provisioning of MNO profiles. Networking and application system 10 includes an intermedium gateway or module—herein referred to as Subscription Manager (SM)-Proxy 28. SM-Proxy 28 interfaces with SM-DP 22 of target MNO 16 and SM-SR 20 of current MNO 14. SM-Proxy 28 includes the required certificates from the Certificate Issuer, which enable SM-Proxy 28 to authenticate itself to SM-DP 22 and SM-SR 20 and secure all related data transfers.

In an embodiment, networking and application system 10 includes a Short Message Service Gateway (SMS-GW) 30. SMS-GW 30 communicates with eSIM 12 via SMS interface and can be used to provide SIM OTA provisioning of MNO profiles.

Network and application system 10 further includes an Agreement Management system 32 that implements policies for current MNO 14 to control which of its target MNO 16 partners are allowed to provision their profiles to eSIMs 12 belonging to current MNO 14. Other policies can also be set such as:

[c1] EIDs (eUICC Identifiers) that target MNO 16 can provision via SM-Proxy 28.
[c2] The markets in which such provisioning is allowed.
[c3] The length of time during which such provisioning is allowed.

In an embodiment, network and application system 10 also includes a Service Portal 34. Service Portal 34 enables target MNO 12 to provision its policy rules into the Agreement Management system 32 either via a graphic user interface (GUI) front-end or via Application Programming Interfaces (APIs).

In an embodiment, the network and application system 10 further includes a hosted SM-DP 36. If target MNO 16' does not support the GSMA eSIM architectue—i.e., target MNO 16' has not implemented a SM-DP 22 function—hosted SM-DP 36 provides RESTful API interface with target MNO's Provisioning Server 38. Hosted SM-DP 36 is configured to transfer profile information of target MNO 16' from its legacy Provisioning Server 38.

In an embodiment, SM-Proxy 28, SMS-GW 30, Agreement Management system 32, Service Portal 34, and/or hosted SM-DP 36 are hosted on an IPX network 40 as depicted in FIG. 1. In an alternative embodiment, hosted SM-DP 36' may be hosted on a third-party cloud as also depicted in FIG. 1.

FIGS. 2-5 provide signaling diagrams depicting various operations associated with provisioning of SIM profile of target MNO 16 to eSIM 12.

Creating Target MNO Profile on eSIM

Figure 2:
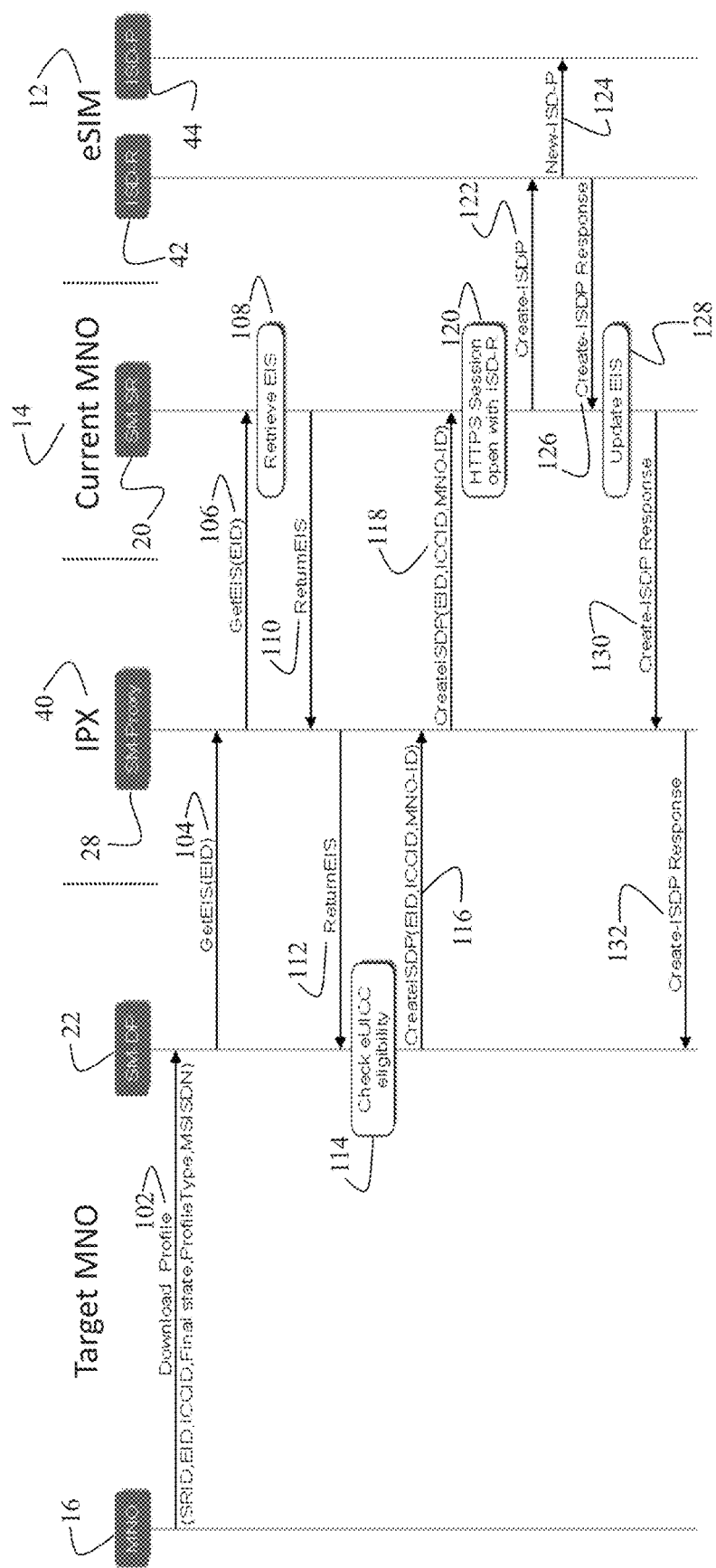
FIG. 2 is a signaling diagram schematically depicting a flow for creating a Profile of the target MNO on the eSIM.

FIG. 2 depicts a signaling diagram for creating a new SIM profile of target MNO 16 on eSIM 12. In step 102, target MNO 16 sends its profile description to SM-DP 22. In an embodiment, the profile description includes ID of SM-SR 20 (SRID), ID of eSIM 12 (EID), Integrated Circuit Card ID (ICCID), Final State, Profile Type, and/or Mobile Station International Subscriber Directory Number (MSISDN). In step 104, SM-DP 22 sends a request to SM-Proxy 28 for EID. SM-Proxy 28 sends the request for the EID to SM-SR 20 of current MNO 14 in step 106. In step 108, SM-SR 20 retrieves eSIM Information Set (EIS) 108 and, in step 110 sends EIS to SM-Proxy 28. In step 112, SM-Proxy 28 returns the EIS to SM-DP 22.

Next, in step 114, SM-DP 22 checks eligibility of eSIM 12 based on the received EIS. In step 116, SM-DP 22 sends a request to SM-Proxy 28 to create an Issuer Security Domain Profile (ISD-P) 44 in eSIM 12. The request includes the EID, ICCID, and MNO-ID. In step 118, SM-Proxy 28 sends the request to create ISD-P 44 to SM-SR 20 of current MNO 14. In step 120, SM-SR 20 opens an HTTPS Session with Issuer Security Domain Root (ISD-R) 42. In step 122, SM-SR 20 sends the request to create ISD-P 44 to ISD-R 42. In step 124, ISD-R 42 creates a new ISD-P 44 in eSIM 12. In step 126, ISD-R 42 sends response to SM-SR 20. Responsive to receiving this response, in step 128, SM-SR 20 updates the EIS accordingly. In step 130, SM-SR 20 sends the Create ISD-P Response to SM-Proxy 28. Finally, in step 132, SM-Proxy 28 sends the Create ISD-P Response to SM-DP 22 confirming that profile of target MNO 16 has been created on eSIM 12.

Downloading Target MNO Profile onto eSIM

Figure 3:
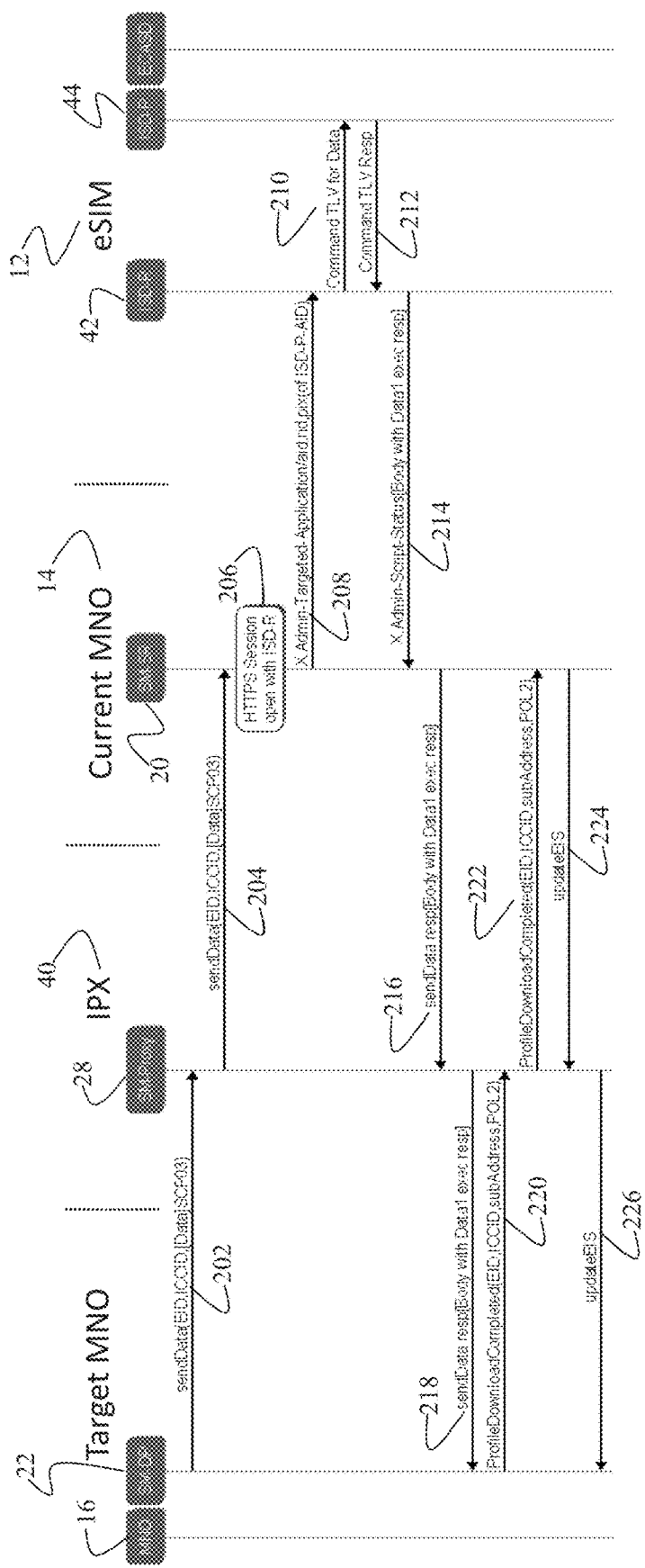
FIG. 3 is a signaling diagram schematically depicting a flow for downloading the Profile information of the target MNO on the eSIM.

FIG. 3 depicts a signaling flow for downloading the profile of target MNO 16 onto eSIM 12. In step 202, SM-DP 22 sends EID, ICCID, and a key for Secure Channel Protocol (SCP) to SM-Proxy 28. In step 204, SM-Proxy 28 sends this data to SM-SR 20 of current MNO 14. In step 206, SM-SR 20 opens HTTPS Session with ISD-R 42 of eSIM 12. In step 208, SM-SR 20 trigger the HTTPS request towards the ISD-R 42 containing the secure data as provided by SM-DP 22, including the X-Admin-Targeted-Application HTTP header with the ISD-P-Application Identifier (AID). In step 210, ISD-R 42 sends a Command Tag-Length-Value (TLV) for Data to ISD-P 44. In step 212, ISD-P 44 provides a Command TLV Response back to ISD-R 42. In step 214, ISD-R 42 returns the HTTPS response, with a X-Admin-Script-Status header. The "X-Admin-Script-Status" header value is used to return the delivery status of the previous remote Application Protocol Data Unit (APDU) format string. The possible values are defined as follows: "ok": this value is used if the previous remote APDU format string has been successfully delivered; "unknown-application": this value is used if the application targeted by the previous remote APDU format string could not be found; "not-a-security-domain": this value is used if the application targeted by the previous remote APDU format string is not a Security Domain; and "security-error": this value is used if the Security Domain targeted by the previous remote APDU format string is not able to check its security.

In step 216, data provided by eSIM 12 in previous step is sent to SM-Proxy 28, which sends it to SM-DP 22 in step 218. In step 220, SM-DP 22 sends a Profile Download Completed message, which includes EID, ICCID, subAddress, and definition of Policy Rules (POL2) to SM-Proxy 28. In step 222, SM-Proxy 28 sends this information to SM-SR 20. SM-SR 28 sends updateEIS message to SM-Proxy 28, which sends it to SM-DP 22 in step 226.

Activation of Target MNO's Profile on eSIM

Figure 4:
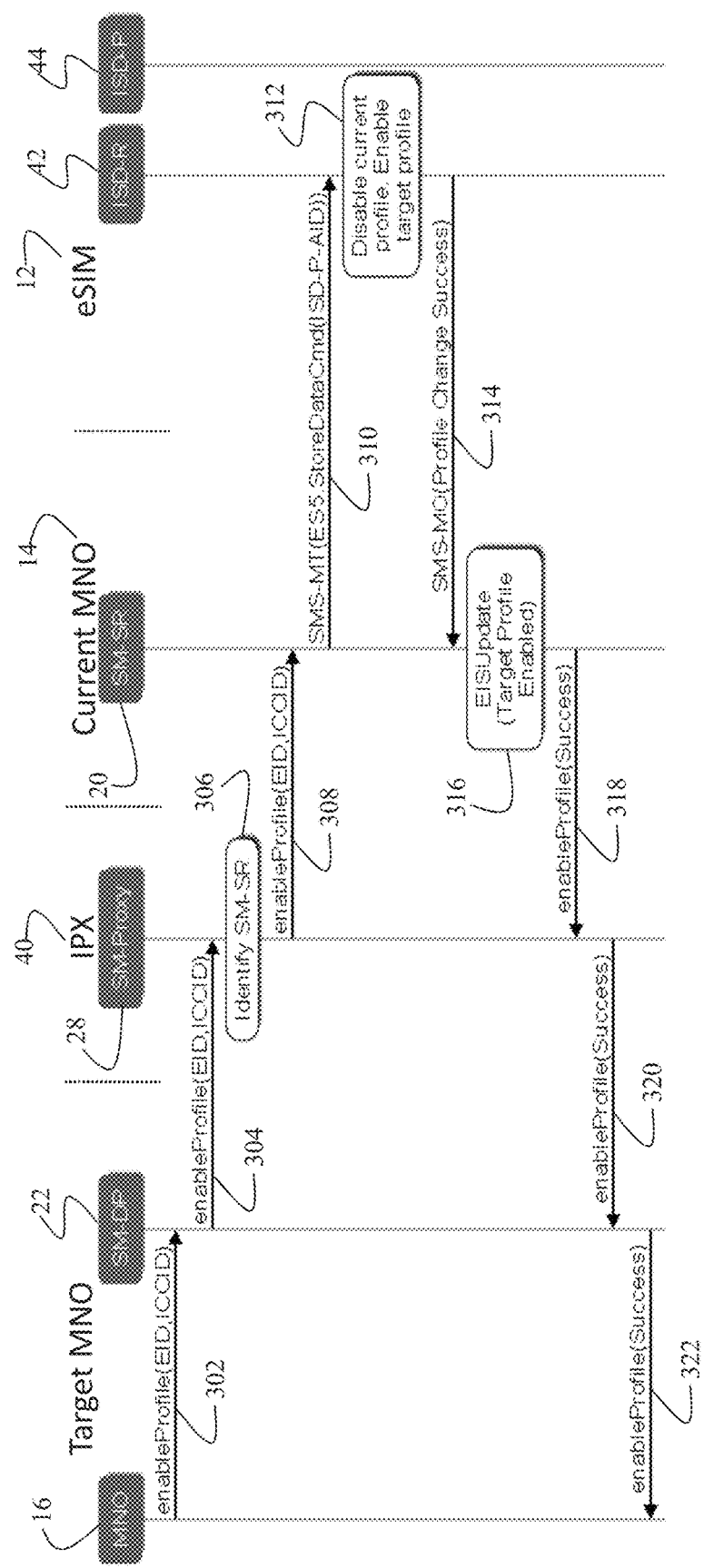
FIG. 4 is a signaling diagram schematically depicting a flow for activating the Profile of the target MNO on the eSIM.

FIG. 4 is a signaling flow diagram depicting the steps for activating profile of target MNO 16 on eSIM 12. In step 302, target MNO 16 sends a request to enable target MNO 16's profile to SM-DP 22. The request includes EID and ICCID. In step 304, SM-DP 22 sends the enable profile request to SM-Proxy 28. In step 306, SM-Proxy 28 identifies SM-SR 20 corresponding to current MNO 14. In step 308, SM-Proxy 28 sends enable Profile request to SM-SR 20. In step 310, SM-SR 20 sends a mobile-terminated (MT) SMS message to ISD-R 42 on eSIM 12. In step 312, ISD-R 42 disable profile of current MNO 14 and enables profile of target MNO 14, which has been created and downloaded per procedures described above. In step 314, ISD-R 42 sends a mobile originated (MO) SMS message to SM-SR 42 informing that profile has been successfully changed on eSIM. In step 316, SM-SR 20 updates EIS to reflect that profile of target MNO 16 has been enabled. In step 318, SM-SR 20 communicates successful profile enablement to SM-Proxy 28, which then sends this message to SM-DP 22 in step 320. In step 322, SM-DP 22 confirms to target MNO 16 that its profile has been enabled on eSIM 12.

Deactivation of Target MNO's Profile on eSIM

Figure 5:
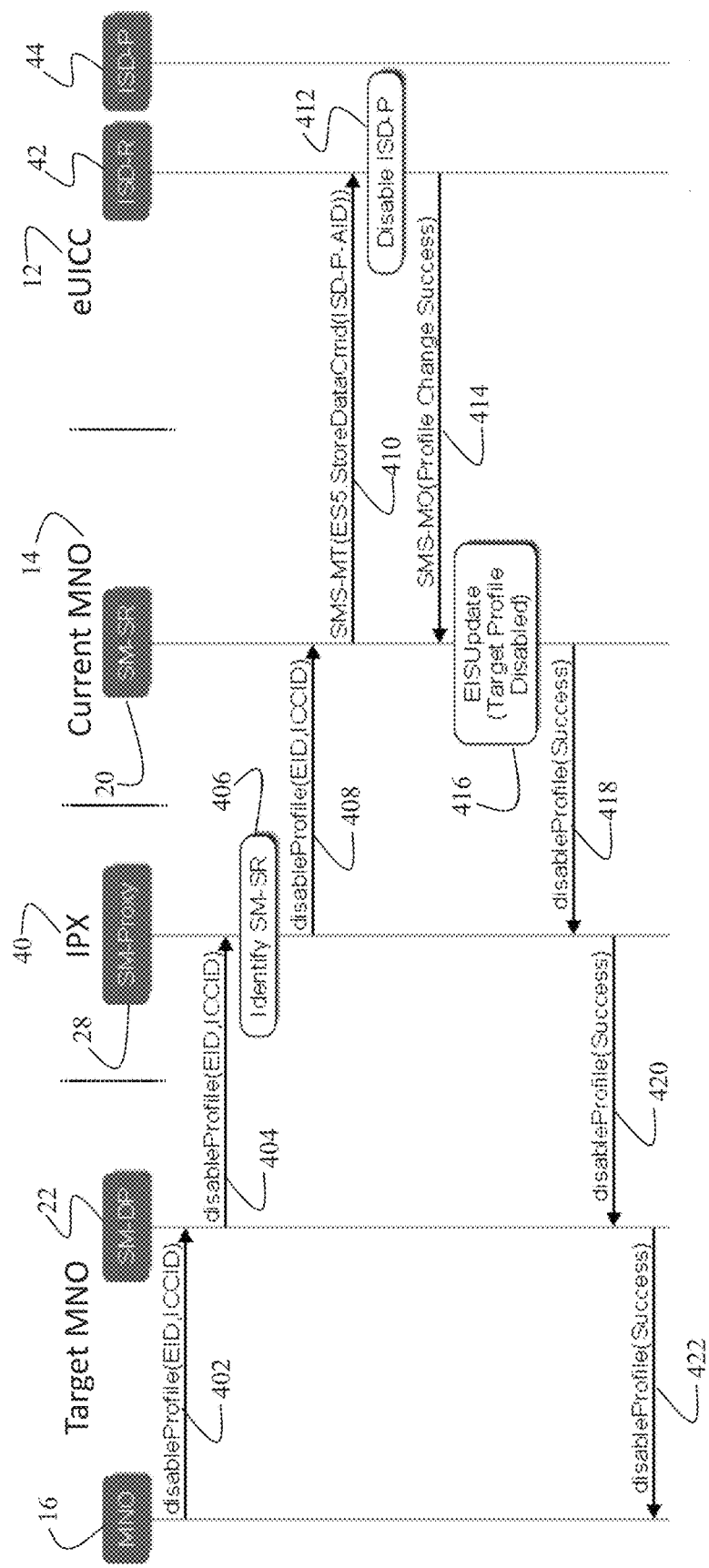
FIG. 5 is a signaling diagram schematically depicting a flow for deactivating the Profile information of the target MNO on the eSIM.

FIG. 5 is a signaling flow diagram depicting the sequence of steps for deactivating profile of target MNO 16 on eSIM 12. In step 402, MNO 16 sends a disable profile request to SM-DP 22. The disable profile request included EID and ICCID. In step 404, SM-DP 22 sends the disable profile request to SM-Proxy 28. In step 406, SM-Proxy 28 identifies SM-SR 20 and, in step 408, sends the disable profile request to SM-SR 20. SM-SR 20 sends an SMS-MT to ISD-R 42 in step 410. The SMS-MT includes the AID of ISD-P 44. In step 412, ISD-R 42 disables ISD-P 44. In step 414, ISD-R 42 sends a SMS-MO to SM-SR 20 indicating that profile on eSIM has been successfully changed. In step 416, SM-SR 20 updates EIS to reflect that the profile of target MNO 16 has been disabled on eSIM 12. In step 418, SM-SR 20 sends a message to SM-Proxy 28 indicating that the profile of target MNO 16 has been successful. In step 420, SM-Proxy 28 sends this message to SM-DP 22, which, in step 422, sends it to target MNO 16.

Hardware and Software Examples

The various techniques described herein can be implemented in connection with hardware or software or, where appropriate, with a combination of both. Thus, the methods and system described herein, or certain aspects or portions thereof, can take the form of program code (i.e., instructions) embodied in tangible media, such as hard drives, solid state drives, or any other machine-readable storage medium, wherein, when the program code is loaded into and executed by a machine, such as a computing device, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The invention can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the invention. Additionally, any storage techniques used in connection with the invention can be a combination of hardware and software.

While methods, apparatuses, and systems have been described in connection with exemplary embodiments of the various figures, it is to be understood that other similar embodiments can be used or modifications and additions can be made to the described embodiments for performing the same function without deviating therefrom. Therefore, the invention should not be limited to any single embodiment, but rather should be construed in breadth and scope in accordance with the appended claims.

What is claimed is:

1. A system for an embedded subscriber identification module (eSIM) provisioning management comprising:
   a Subscription Management Proxy (SM-Proxy) in communication with a Subscription Manager Data Preparation (SM-DP) of a target mobile network operator (MNO) and Subscription Manager Secure Routing (SM-SR) of a current MNO, wherein the eSIM is associated with the SM-SR of the current MNO, the system for the eSIM provisioning management configured to enable Mobile Virtual Network Operator (MVNO) services without requiring pre-existing agreements between the current MNO and the target MNO, the SM-Proxy configured to perform the steps comprising:
   receiving requests from SM-DP of the target MNO for creating, downloading, enabling, or disabling a Profile information of the target MNO on the eSIM, the Profile information being selected from a group consisting of a file structure, data, applications, or a combination thereof;
   responsive to receiving the requests from SM-DP of the target MNO, SM-Proxy is configured to transmit requests to the SM-SR of the current MNO for creating, downloading, enabling, or disabling the Profile information of the target MNO on the eSIM;
   receiving a confirmation message from the SM-SR of the current MNO that the Profile information of the target MNO has been successfully created, downloaded, activated, or deactivated on the eSIM; and
   transmitting the confirmation message to the SM-DP of the target MNO notifying the target MNO that the Profile information thereof has been successfully created downloaded, activated or deactivated on the eSIM.

2. The system of claim 1, further comprising a hosted SM-DP, the hosted SM-DP configured to implement a RESTful Application Program Interface (API) to receive the Profile information from a provisioning server in the target MNO.

3. The system of claim 2, wherein the hosted SM-DP implements the RESTful API toward the provisioning server in a network of the target MNO.

4. The system of claim 2, wherein the hosted SM-DP and the provisioning server perform mutual authentication.

5. The system of claim 2, wherein the hosted SM-DP and the provisioning server encrypt data transfers.

6. The system of claim 1, further comprising an Agreement Management system, the Agreement Management system configured to control a set of eSIM provisioning rules.

7. The system of claim 6, wherein the Agreement Management system validates eSIM provisioning requests by implementing a policy control server interface with the SM-Proxy.

8. The system of claim 6, further comprising a Service Portal, the Service Portal configured to enable the current MNO to manage the set of eSIM provisioning rules across a plurality of target MNOs.

9. The system of claim 8, wherein the Service Portal provides a graphic user interface (GUI) to the target MNO to provision the set of eSIM provisioning rules.

10. The system of claim 8, wherein the Service Portal provides an API to the MNO to automate the provisioning of the set of eSIM provisioning rules.

11. The system of claim 1, wherein the SM-Proxy is configured to authenticate itself to the SM-DP of the target MNO and the SM-SR of the current MNO using certificates issued by a Certificate Issuer.

12. The system of claim 1, wherein data transfer between the SM-Proxy, the SM-DP and the SM-SR is encrypted and decrypted by the SM-Proxy.

13. A method for an embedded subscriber identification module (eSIM) provisioning management comprising:
   providing a Subscription Management Proxy (SM-Proxy) in communication with a Subscription Manager Data Preparation (SM-DP) of a target mobile network operator (MNO) and Subscription Manager Secure Routing (SM-SR) of a current MNO, wherein the eSIM is associated with the SM-SR of the current MNO, the method for the eSIM provisioning management enabling Mobile Virtual Network Operator (MVNO) services without requiring pre-existing agreements between the current MNO and the target MNO, the SM-Proxy configured to perform the steps comprising:
   receiving, at the SM-Proxy, requests from SM-DP of the target MNO for creating, downloading, enabling, or disabling a Profile information of the target MNO on the eSIM, the Profile information being selected from a group consisting of a file structure, data, applications, or a combination thereof;
   responsive to SM-Proxy receiving the requests from SM-DP of the target MNO, transmitting, by the SM-Proxy, requests to the SM-SR of the current MNO for creating, downloading, enabling, or disabling the Profile information of the target MNO on the eSIM;
   receiving, at the SM-Proxy, a confirmation message from the SM-SR of the current MNO that the Profile information of the target MNO has been successfully created, downloaded, activated, or deactivated on the eSIM; and
   transmitting, by the SM-Proxy, the confirmation message to the SM-DP of the target MNO notifying the target MNO that the Profile information thereof has been successfully created downloaded, activated or deactivated on the eSIM.

14. The method of claim 13, further comprising the step of providing a hosted SM-DP, the hosted SM-DP configured to implement a RESTful API to receive the Profile information from a provisioning server in the target MNO.

15. The method of claim 14, wherein the hosted SM-DP implements the RESTful Application Programming Interface (API) toward the provisioning server in a network of the target MNO.

16. The method of claim 14, wherein the hosted SM-DP and the provisioning server perform mutual authentication.

17. The method of claim 13, further comprising the step of providing an Agreement Management system, the Agreement Management system configured to control a set of eSIM provisioning rules.

18. The method of claim 17, wherein the Agreement Management system validates eSIM provisioning requests by implementing a policy control server interface with the SM-Proxy.

19. The method of claim 18, further comprising the step of providing a Service Portal, the Service Portal configured to enable the current MNO to manage the set of eSIM provisioning rules across a plurality of target MNOs.

20. The method of claim 19, wherein the Service Portal provides an API to the MNO to automate the provisioning of the set of eSIM provisioning rules.

\* \* \* \* \*